May 24, 1949.  L. S. RINK  2,470,899
WEEDING DEVICE
Filed Oct. 18, 1945  2 Sheets-Sheet 1
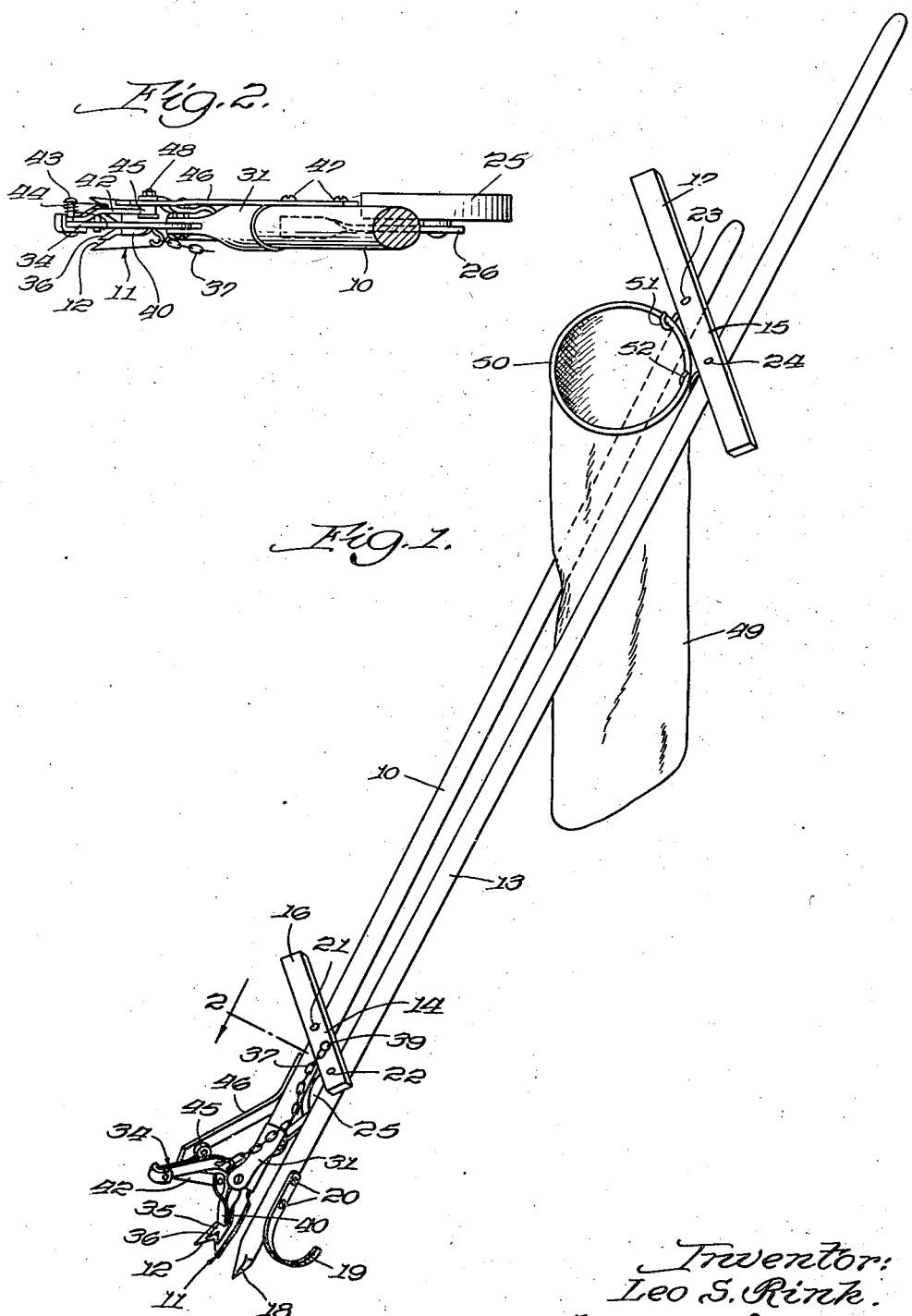
Inventor:
Leo S. Rink.
By Kenneth T. Snow
Atty.

May 24, 1949.

L. S. RINK 2,470,899

WEEDING DEVICE

Filed Oct. 18, 1945

Inventor:
Leo S. Rink.
By Kenneth T. Snow
Atty.

Patented May 24, 1949

2,470,899

UNITED STATES PATENT OFFICE 2,470,899

WEEDING DEVICE

Leo S. Rink, Moline, Ill.

Application October 18, 1945, Serial No. 623,093

13 Claims. (Cl. 254—132)

1

This invention relates to a new and improved weeding device and has for one of its principal objects the provision of means for extruding a weed from the ground.

An important object of this invention is to provide a device for removing weeds from a garden without bending, stooping, or digging them out by hand.

There have been many weeding devices manufactured and still more weeding devices have been patented, but the major portion of them are concerned with gripping a weed by a clamping action and then removing it from the ground. In contradistinction to these many prior devices, the applicant's weeder is provided with a long handle spade capable of penetrating the earth closely adjacent a weed and means entering the earth with the spade to kick the weed free of its position in the ground. It is, therefore, an important object of the invention to provide a weeding device which throws the weed including its root to a position on the surface of the ground.

A further important object of this invention is to provide a weed kicking member with a stripping device whereby the weed is positively extruded from the ground and stripped from the weeder.

A still further important object of this invention is to provide a weeding device having a transporting wheel for carrying the load of the weeding device from one weed to the next.

Still another object of this invention is the provision of an elongated spade holding pole and a substantially parallel rest pole with a pair of parallel links joining the spade and the rest poles for forming hand and foot levers to effect operation of the weed extruding elements.

A still further object is to provide a weeding device which extrudes the weed with a minimum of effort on the part of the operator and one which is relatively simple in operation.

A still further object is to provide a weed extracting device having a depository suspended therefrom for receiving the extruded weeds.

Other and further important objects of this invention will become apparent from the following specification and accompanying drawings in which:

Figure 1 is a perspective view of the weeding device of this invention.

Figure 2 is a plan view of the weeder taken on the line 2 of Figure 1.

As shown in the drawings:

Figure 3:
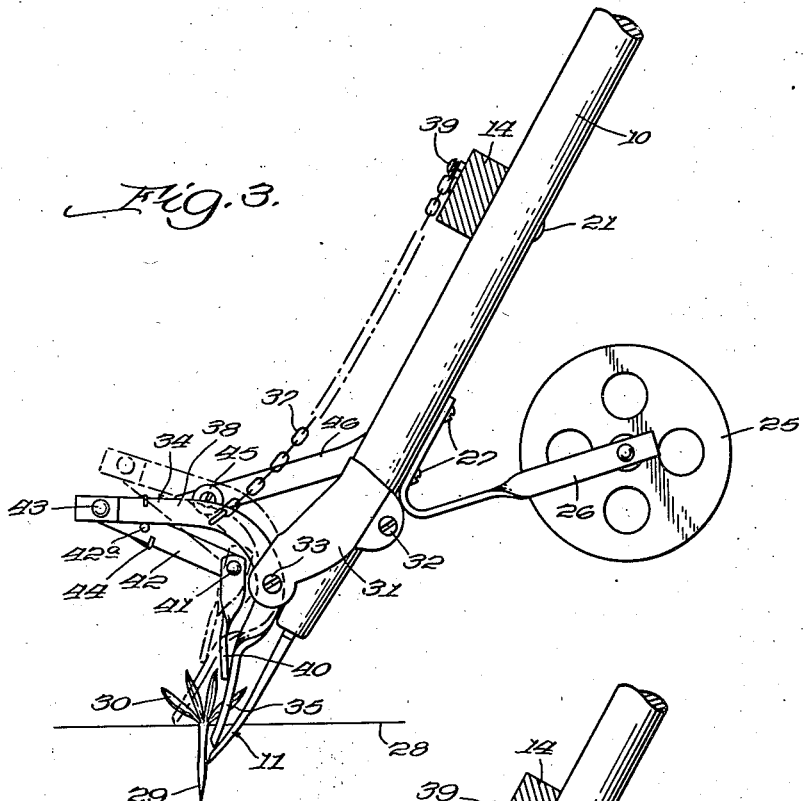
Figure 3 is an enlarged side elevational view of the weed extracting mechanism of this invention.

The reference numeral 10 indicates generally a pole, the bottom end of which supports a spade member 11 having a V-shaped notch 12. The spade 11 is adapted to be pushed in the ground behind a weed or other plant to be removed from its growing position. A downward force applied to the pole 10 will effect the penetration of the spade 11.

A rest pole 13 slightly longer than the spade holding pole 10 is positioned substantially parallel to the pole 10. The poles 10 and 13 are joined by parallel links 14 and 15. Both of these links have extensions 16 and 17 which act as foot and hand levers respectively. The rest pole 13 has a relatively sharp point 18 which easily penetrates the ground to a depth limited by a stop member 19 fixedly attached to the pole 13 by screws or the like 20. The rest pole 13 is placed in the ground slightly to the left and to the rear of the weed to be extracted. After this rest pole is firmly placed in position, the spade holding pole 10 may then be pushed downwardly either by foot pressure on the foot lever 16 or hand pressure on the hand lever 17. The parallel links 14 and 15 are pivotally attached to the poles 10 and 13 at 21 and 22 and 23 and 24, respectively. The rest pole 13 acts as a guide to cause penetration of the spade 11 at the proper place, supports the foot and hand levers 16 and 17, and may be used as a crutch for a lame person getting exercise using the weeder of this invention.

Figure 4:
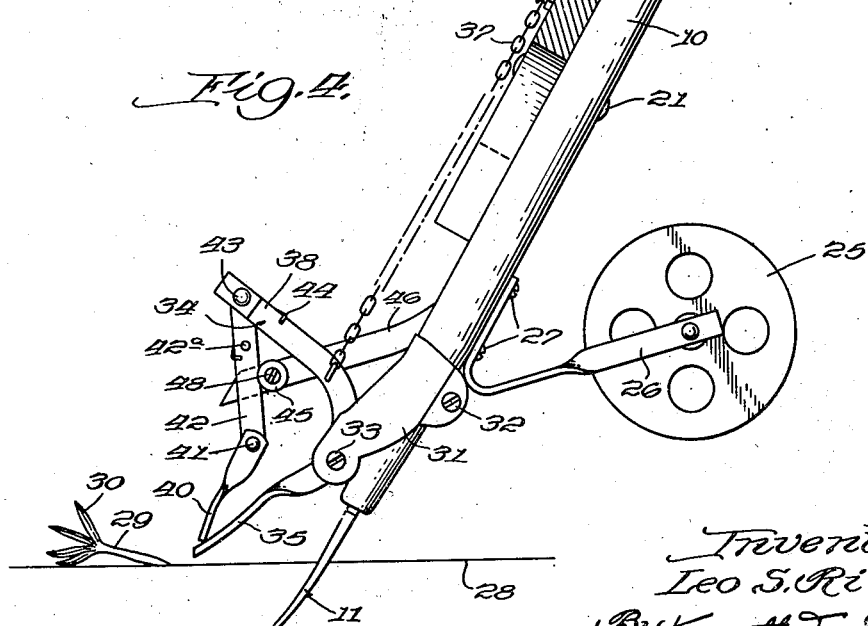
Figure 4 is a view similar to Figure 3, showing the extracting elements in raised position.

As shown in Figures 2, 3 and 4, the spade holding pole 10 is equipped with a transport wheel 25 journaled on a bracket 26 which is fastened to the pole 10 by means of screws or the like 27. The transport wheel 25 is used mainly for movement of the weeding device from one position to another. During such movement the poles 10 and 13 are inclined at a relatively small angle of approximately 30°. As shown in Figures 3 and 4 the poles 10 and 13 have been raised to an angle of approximately 60° with the ground, and in such position the transport wheel 25 does not engage the ground. The stop member 19 may be used as a transport runner or skid in place of the wheel 25 if it is desired to eliminate the wheel 25.

As shown in Figure 3, the pole 10 has been pushed downwardly to a point where the spade 11 has penetrated the ground line 28 and is closely adjacent a root 29 of a weed 30. A bracket 31 is clamped to the pole 10 by means of a bolt 32 and forms a pivotal support at 33 for a weed extracting bell-crank lever 34. One arm 35 of the bell-crank lever 34, as shown in Figure 1, is placed on top of the spade member 11, and it also is equipped with a sharpened end and a V-shaped notch 36 similar to the notch 12 in spade 11.

A chain 37 is attached to the other arm 38 of the bell-crank lever 34 and at its other end is attached at 39 to the parallel link cross-bar 14 which comprises the foot lever 16. As shown in Figure 1, this chain 37 is attached to the arm 14 intermediate its pivotal attachments 21 and 22 for the poles 10 and 13 respectively. In the position of the spade as shown in Figure 3, continued downward movement of the foot lever 16 or hand lever 17 about their pivots 21 and 23 respectively causes the chain 37 to become taut and to rise as it is attached to the link arm 14 on the side of the pivot 21 opposite the foot lever 16, and as shown in the dashed line position of the weed lifting element 34, the spade engaging portion 35 has separated from the spade 11 and caused the weed to be lifted or throw from the ground.

On some occasions the root 29 of the weed becomes lodged in the V-shaped end 36 of the weed lifting member 34, and continued downward movement of the hand lever 17 causes a stripping of the arm 35 by a stripper element 40. The stripper element 40 is hinged at 41 to an intermediate arm 42 which in turn is hinged at 43 to an upper point on the arm 38 of the weed lifting bell-crank lever 34. A spring 44 is clamped around the members 42 and 38 so as to tend to maintain them in a jack-knife position limited by a stop in the form of a post 42ª on the arm 42. A cam roller 45 is attached to a stationary frame member 46 which is mounted on the spade holding pole 10 by means of screws or the like 47 as best shown in Figure 2. The roller 45 is journaled for rotation on a bolt 48. The stripping member 40 remains inoperative until the arm 42 contacts the roller cam 45. This is illustrated in Figure 3 in which the full lines indicate the first position after ground penetration of the spade 11 and the dashed line position shows the weed extracting member 35 moving the weed from its growing position in the ground to a position above the ground. The supporting arm 42 of the stripping element 40 is shown as just arriving at contact with the roller cam 45. Continued upward movement of the hand lever 17 with the rest pole 13 remaining on the ground causes the arm 42 to be pulled around the roller 45, and the stripper member 40 is extended the length of the weed lifting member 35, thus extruding in an endwise direction any weed that might possibly have lodged within the V-shaped notch in the forward end of the weed lifting arm 35. Often times the stripping member 40 is not necessary, and it should be understood that the weeding device of this invention is operable with or without the weed stripper. The wheel 25 is employed to roll back the device before stripping so that the weed may be ejected close to the operator and then picked up and dropped into a bag depository 49 suspended from the implement when the implement is pushed forwardly again to the next weed in the lawn.

After the weed 30 has been thrown out of the ground and stripped from the member 35 by the stripper 40, it may then be picked up and deposited in the bag 49 which has a substantially rigid rim 50 at the top thereof to maintain the bag open at all times. The bag 49 is fastened to the parallel arm 15 by means of hooks 51 and 52. The bag 49 is positioned between the poles 10 and 13 and hence is in an out of the way position during operation of the weeder.

Numerous details of construction may be varied throughout a wide range without departing from the principles disclosed herein, and I therefore do not propose limiting the patent granted hereon otherwise than as necessitated by the appended claims.

What is claimed is:

1. A weed removing device comprising a ground penetrating spade fixed to a hand pole, a weed throw-out member pivotally attached to the hand pole for movement from a position adjacent the spade for entering the ground therewith to a position away from the spade, means for effecting pivotal movement of the weed throw-out member when the spade is in the ground behind a weed, said means including a lever arm pivotally attached to and extending laterally of said hand pole above said spade and throw-out member, and a chain attached to said lever arm at a point spaced to one side of its pivotal attachment to the hand pole, said chain extending downwardly and attached to the weed throw-out member at a point spaced from its pivotal attachment to the hand pole, whereby a downward movement of the lever arm at a point spaced to the other side of its pivotal attachment to the hand pole causes an upward and forward movement of the throw-out member thus lifting the weed from the ground.

2. A weed removing device comprising a ground penetrating spade fixed to a hand pole, a weed throw-out member pivotally attached to the hand pole for movement from a position adjacent the spade for entering the ground therewith to a position away from the spade, means for effecting pivotal movement of the weed throw-out member when the spade is in the ground behind a weed, said means including a lever arm pivotally attached to said hand pole above said spade and throw-out member, a chain attached to said lever arm at a point spaced to one side of its pivotal attachment to the hand pole, said chain extending downwardly and attached to the weed throw-out member at a point spaced from its pivotal attachment to the hand pole, whereby a downward movement of the lever arm at a point spaced to the other side of its pivotal attachment to the hand pole causes an upward and forward movement of the throw-out member thus lifting the weed from the ground, a rest pole positioned parallel to said hand pole, said lever arm pivotally attached to said rest pole on the chain attachment side of its pivotal attachment to the hand pole, and a second lever arm parallel to the first lever arm and pivotally attached to the hand and rest poles at points spaced upwardly from said first lever arm, whereby the first lever arm is operated by foot and the second lever arm is operated by hand and both either together or singly performing the same function because of the parallel arrangement of the poles and the parallel arrangement of the lever arms.

3. A plant removing device including a hand pole, a ground penetrating spade fixed to the lower end of the pole, a bell-crank lever pivotally attached to the upper portion of the spade and having one arm normally lying against the spade and being sharpened for penetrating the ground with the spade and another arm extending outwardly at substantially a right angle with respect to the spade, and means for pulling upwardly on the outwardly extending arm whereby the arm lying against the spade is moved upwardly and forwardly away from the spade, said means including a chain attached to said outwardly extending arm and to one side of a lever means pivoted to said hand pole above said spade for raising said chain by lowering the other side of said pivoted lever means.

4. A plant removing device including a ground penetrating spade, a bell-crank lever pivotally attached to the upper portion of the spade and having one arm normally lying against the spade and being sharpened for penetrating the ground with the spade and another arm extending outwardly at substantially a right angle with respect to the spade, and means for pulling upwardly on the outwardly extending arm whereby the arm lying against the spade is moved upwardly and forwardly away from the spade, said means including a chain attached to said outwardly extending arm and lever means for raising and lowering said chain, said lever means comprising parallel links for hand and foot operation.

5. A plant removing device including a ground penetrating spade, a bell-crank lever pivotally attached to the upper portion of the spade and having one arm normally lying against the spade and being sharpened for penetrating the ground with the spade and another arm extending outwardly at substantially a right angle with respect to the spade, link means for pulling upwardly on the outwardly extending bell-crank lever arm to effect a rotation of the bell-crank lever about its pivotal attachment whereby the bell-crank lever arm lying against the spade is moved upwardly and forwardly away from the spade to effect a removal of a plant from the ground, and stripping means associated with said bell-crank lever and arranged and constructed to move across the one arm of the bell-crank lever lying against the spade for removing a plant therefrom after it has been pulled from the ground by the initial raising of the bell-crank lever arm lying against the spade.

6. A plant removing device including a ground penetrating spade, a bell-crank lever pivotally attached to the upper portion of the spade and having one arm normally lying against the spade and being sharpened for penetrating the ground with the spade and another arm extending outwardly at substantially a right angle with respect to the spade, means for pulling upwardly on the outwardly extending arm whereby the arm lying against the spade is moved upwardly and forwardly away from the spade to effect a removal of a plant from the ground, plant stripping means for removing the plant from the arm of the bell-crank lever that raises the plant from the ground, said stripping means comprising a stripping element adapted to slide the length of the arm to be stripped, an intermediate arm pivoted to the end of the outwardly extending arm of the bell-crank lever, said stripping element pivoted to the other end of said intermediate arm, and cam means for engaging said intermediate arm, whereby when the bell-crank lever is pivoted the stripping element slides over the ground penetrating arm of the bell-crank lever.

7. A plant removing device including a ground penetrating spade, a bell-crank lever pivotally attached to the upper portion of the spade and having one arm normally lying against the spade and being sharpened for penetrating the ground with the spade and another arm extending outwardly at substantially a right angle with respect to the spade, means for pulling upwardly on the outwardly extending arm whereby the arm lying against the spade is moved upwardly and forwardly away from the spade to effect a removal of a plant from the ground, plant stripping means for removing the plant from the arm of the bell-crank lever that raises the plant from the ground, said stripping means comprising a stripping element adapted to slide the length of the arm to be stripped, an intermediate arm pivoted to the end of the outwardly extending arm of the bell-crank lever, said stripping element pivoted to the other end of said intermediate arm, cam means for engaging said intermediate arm, and a spring arranged to maintain said intermediate arm in a jack-knife relationship with said outwardly extending arm of the bell-crank lever, whereby when the ground penetrating arm of the bell-crank lever is in the ground against the spade the stripping element is adjacent the top of said ground penetrating arm, but when said arm is raised upwardly and forwardly away from the spade and out of the ground the stripping element slides out to the end of said arm thus cleaning it of any material.

8. A weed removing device comprising parallel poles, parallel links pivotally attached to said poles near their lower and upper ends, a ground penetrating spade on the end of one of said poles, and a stop element near the end of the other of said poles, whereby the lower parallel link acts as a foot lever for causing the spade to enter the ground about the stop element as a support and the upper parallel link acts as a hand lever for performing the same function.

9. A weed removing device comprising parallel poles, parallel links pivotally attached to said poles near their lower and upper ends, a ground penetrating spade on the end of one of said poles, a stop element on the end of the other of said poles, and a weed raising lever associated with the pole having the spade, said lever having a chain attached thereto and extending upwardly to attachment to one of said parallel links, whereby pivotal downward movement of said links causes the weed raising lever to lift upwardly and forwardly away from said spade.

10. A weed removing device comprising parallel poles, parallel links pivotally attached to said poles near their lower and upper ends, a ground penetrating spade on the end of one of said poles, a stop element on the end of the other of said poles, a weed raising lever hingedly attached to said pole having the spade, said lever having a chain attached thereto and extending upwardly for attachment to one of said parallel links, whereby pivotal downward movement of said links causes the weed raising lever to lift upwardly and forwardly away from said spade, and a stripping element arranged and constructed to slide longitudinally over said weed raising lever when said lever is raised away from said spade.

11. A plant removing device including a ground penetrating spade, a bell-crank lever pivotally attached to the upper portion of the spade and having one arm normally lying against the spade and being sharpened for penetrating the ground with the spade and another arm extending outwardly at substantially a right angle with respect to the spade, link means for pulling upwardly on the outwardly extending bell-crank lever arm to cause rotation of the bell-crank lever about its pivotal attachment whereby the bell-crank lever arm lying against the spade is moved upwardly and forwardly away from the spade, said link means including a chain attached to said outwardly extending bell-crank lever arm and lever means for raising and lowering said chain, and plant stripping means attached to the upper portion of said ground penetrating spade for longitudinal sliding movement over the arm of the bell-crank lever that raises the plant from the ground.

12. A weeder comprising a pole structure, a first ground penetrating spade mounted at the lower end of said pole structure, a second ground penetrating spade hinged to said pole structure and positioned above and adjacent said first ground penetrating spade in one position thereof, link means for raising said second spade about its hinge away from the first spade, and means attached to said pole structure arranged and constructed for longitudinal sliding movement on and over said second spade for stripping a weed endwise from said second spade when the second spade is raised about its hinge away from the first spade.

13. A weeder comprising a pole structure, a first ground penetrating forked spade mounted at the lower end of said pole structure, a second ground penetrating forked spade hinged to said pole structure and positioned above and adjacent said first ground penetrating spade in one position thereof, link means for raising said second spade about its hinge away from the first spade, and means attached to said pole structure arranged and constructed to slide longitudinally on and over said second forked spade for stripping a weed from the fork thereof when the second spade is raised about its hinge away from said first spade.

LEO S. RINK.

REFERENCES CITED

The following references are of record in the file of this patent:

UNITED STATES PATENTS

| Number | Name | Date |
|--------|------|------|
| 567,391 | Hopper | Sept. 8, 1896 |
| 792,189 | Banks | June 13, 1905 |
| 950,012 | Bender | Feb. 22, 1910 |
| 1,619,856 | Davis | Nov. 8, 1927 |
| 1,919,396 | Sadler | July 25, 1933 |
| 2,069,958 | Kool | Feb. 9, 1937 |
| 2,355,732 | Jepsen | Aug. 15, 1944 |